UNITED STATES PATENT OFFICE.

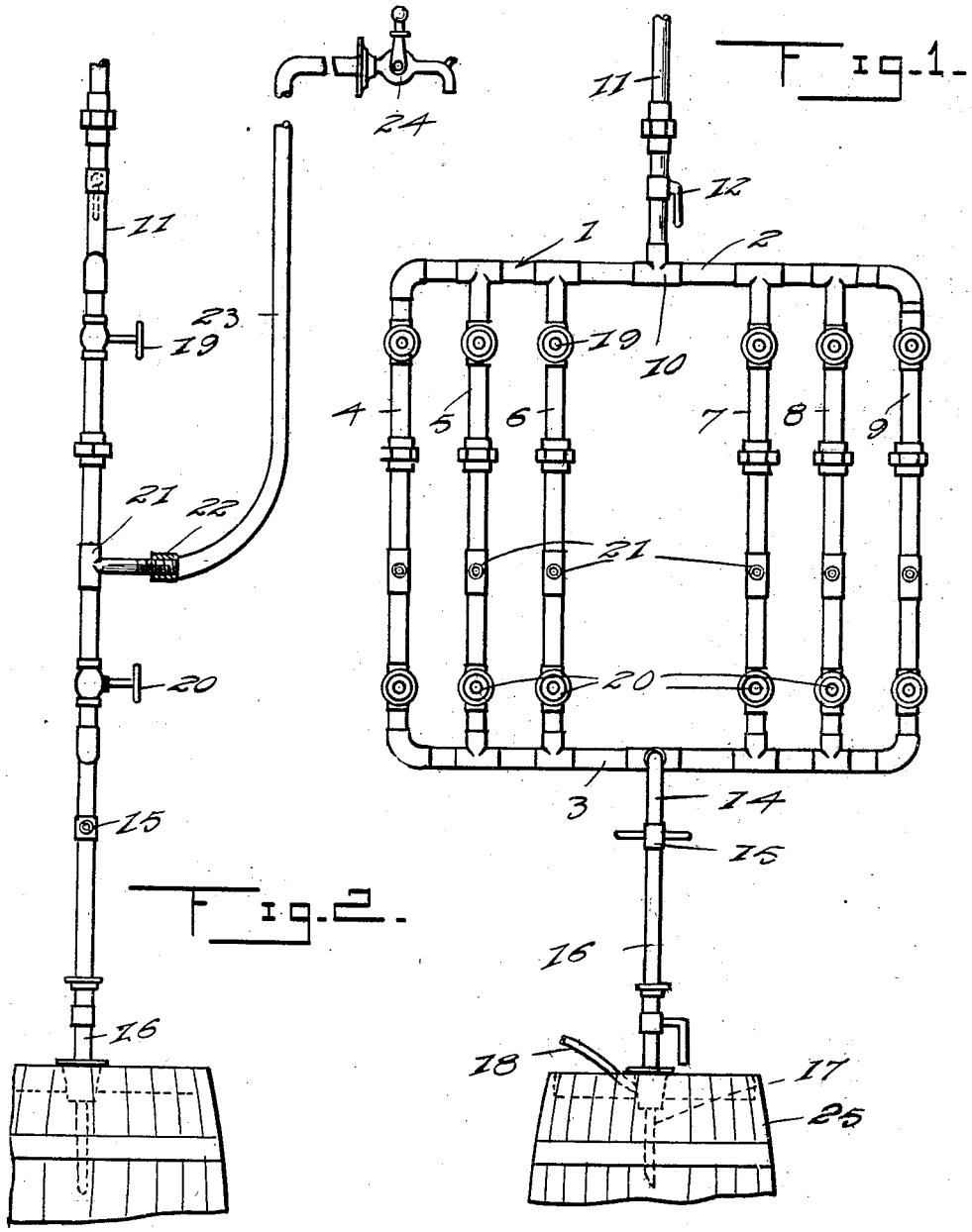

GIUSEPPI DOTI, OF CORONA, NEW YORK.

BEER-PIPE CLEANER.

1,246,803.　　　Specification of Letters Patent.　　Patented Nov. 13, 1917.

Application filed March 28, 1916. Serial No. 87,230.

*To all whom it may concern:*

Be it known that I, GIUSEPPI DOTI, a citizen of the United States, residing at Corona, L. I., in the county of Queens and State of New York, have invented certain new and useful Improvements in Beer-Pipe Cleaners; and I do hereby declare the following to be a full, clear, and exact description of the invention, such as will enable others skilled in the art to which it appertains to make and use the same.

This invention relates to a beer pipe cleaner, and the primary object of the invention is to provide a device, by means of which any one or a number of beer pipes or coils may be cleaned, by being first subjected to warm water, after which the beer pipes are flushed or rinsed by cold water.

A further object of this invention is to provide a frame work, which is constructed of a plurality of pipes having branches, and to connect the frame work of pipe structures to a city water supply pipe, and also to an ordinary barrel or keg tap, so that warm water may be forced upwardly out of a barrel into the pipes of the frame work, and outwardly therethrough into and through the beer pipes, for cleansing the beer pipes, after which the flow of hot water is cut off, and valves for controlling the cold water are opened which permit cold water to flow through the pipe frame work and through the beer pipes.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a front elevation of the improved pipe cleaner, and

Fig. 2 is a side elevation of the pipe cleaner.

Referring more particularly to the drawing, 1 designates the frame work of the cleaner as an entirety, which is constructed of pipe, and has top and bottom pipes 2 and 3 respectively, which are connected by a plurality of cross pipes 4, 5, 6, 7, 8 and 9 as clearly shown in Fig. 1 of the drawing. The top pipe 2 of the frame 1 is connected through the medium of an ordinary T-union 10 to a pipe 11, which pipe is in turn connected to a city water supply. The pipe 11 has a valve structure 12 interposed therein for controlling the flow of water through the pipe 11 and into the pipe structure 1.

The lower end 3 of the pipe structure has a relatively short length of pipe 14 connected thereto on the lower end of which is mounted a coupling 15. The coupling 15 is adapted for connection to a barrel tap indicated at 16, which is of the ordinary construction including the point 17 for insertion into the barrel and the air hose 18 for forcing air through the tap 16 for forcing hot water upwardly out of the same.

The pipes 4, 5, 6, 7, 8 and 9 have valves 19 positioned therein, adjacent to their upper ends, and valves 20 positioned therein adjacent to their lower ends. The valves 19 are provided for permitting or cutting off the flow of cold water through the pipes 4, 5, 6, 7, 8 and 9, while the valves 20 are provided for regulating the flow of hot water therethrough. A plurality of nipples indicated at 21, are connected to the vertical pipes 4, 5, 6, 7, 8 and 9 intermediate the upper valves 19 and the lower valves 20. The nipples 21 are adapted for connection as shown at 22 in Fig. 2 of the drawings, to the hose or ordinary beer pipe 23 which leads upwardly to the spigot as indicated at 24 in Fig. 2.

In cleaning beer pipes with the improved cleaner; a beer barrel indicated at 25 is provided which is partially filled with hot water. The tap 16 is inserted in the barrel 25, and is connected through the medium of a coupling 15 to the pipe 14, which operatively connects the barrel to the cleaner structure 1. The upper valves 19 are closed, and the hose 23 are connected to the nipples 21 after which the valves 20 are opened, and air is forced into the beer barrel 25 through the air pipe 18, which will force the hot water upwardly through the tap 16 the branch pipe 14 and into the lower pipe 3, and upwardly through the vertical pipes 4, 5, 6, 7, 8 and 9, from whence it will pass outwardly through the nipples 21 into and through the beer pipes 23 and be left off at the spigot 24. After sufficient hot water has been run through the beer pipes to clean them, the valves 20 are closed, and the upper valves 19 are opened, which permits of the flushing of the beer pipes 23 by cold water, which cold water passes downwardly through the pipes 4, 5, 6, 7, 8 and 9 out through the nipples 21 upwardly through the beer pipes 23 and is let off at the spigot 24.

If it is desired to clean only one beer pipe at a time, the valves 19 and 20 are regulated, so that the hot water will be forced upwardly through only one of the vertical pipes 4, 5, 6, 7, 8 or 9.

It is to be understood that the pipe 23 and spigot 24 are the only parts of an ordinary beer dispensing apparatus shown and when using the cleaning device, the pipe 23 is disconnected from the beer source, such as a beer keg (not shown) and connected to any one of the nipples 21 so that the same may be readily cleaned by the device. The plurality of nipples 21 are provided so that one or more pipes 23 can be cleaned simultaneously.

In reducing the invention to practice, certain minor features of construction, combination and arrangement of parts may necessitate alterations to which the patentee is entitled provided such alterations are comprehended within the scope of what is claimed.

What is claimed is:—

A beer pipe cleaner comprising upper and lower horizontal pipes, vertical pipes located between and connected to and communicating with the upper and lower pipes, a supply pipe connected to and communicating with the upper pipe, a second supply pipe connected to and communicating with the lower pipe, a horizontal nipple connected to and communicating with each vertical pipe, and a pair of cut-off valves in each vertical pipe located one above and the other below the nipple of each pipe.

In testimony whereof I affix my signature in presence of two witnesses.

GIUSEPPI $\overset{\text{his}}{\underset{\text{mark}}{\times}}$ DOTI,

Per ANDREW F. BREMS.

Witnesses:
GEORGE B. WELLS,
CASPER COSMO.

Copies of this patent may be obtained for five cents each, by addressing the "Commissioner of Patents, Washington, D. C."